United States Patent [19]

Machart, Jr.

[11] Patent Number: 4,604,200
[45] Date of Patent: Aug. 5, 1986

[54] FLUID FILTER WITH UNIFORM SPACING

[75] Inventor: Ronald C. Machart, Jr., Oak Lawn, Ill.

[73] Assignee: IGC, Inc., Bridgeview, Ill.

[21] Appl. No.: 741,751

[22] Filed: Jun. 6, 1985

[51] Int. Cl.[4] .............................................. B01D 27/06
[52] U.S. Cl. .................................. 210/314; 493/941; 210/493.5
[58] Field of Search ............... 210/168, 314, 315, 461, 210/460, 462, 484, 486, 489, 415.5, 493.1, 493.5; 493/456, 941, 405, 408, 417, 421

[56] References Cited

U.S. PATENT DOCUMENTS

| | | | |
|---|---|---|---|
| 966,179 | 8/1910 | Durbrow | 210/314 |
| 1,674,502 | 6/1928 | Davis | 493/405 |
| 2,282,301 | 5/1942 | Petersen | 73/51 |
| 2,447,144 | 8/1948 | Thornton | 210/150 |
| 2,765,716 | 10/1956 | Andersson | 493/468 |
| 3,158,073 | 11/1964 | Rumberger | 493/444 |
| 3,199,275 | 8/1965 | Fesco | 493/941 |
| 3,301,467 | 1/1967 | Shore | 206/312 |
| 3,371,793 | 3/1968 | Fowler | 210/168 |
| 3,826,360 | 7/1974 | Shore | 229/68 |
| 4,105,564 | 8/1978 | Whelan | 493/941 |
| 4,136,011 | 1/1979 | Joseph et al. | 210/168 |
| 4,201,119 | 5/1980 | Wolf | 493/941 |
| 4,210,067 | 7/1980 | Evans, Jr. | 493/941 |
| 4,250,039 | 2/1981 | Cozzi et al. | 210/416.5 |
| 4,264,443 | 4/1981 | Anderson et al. | 210/168 |
| 4,312,753 | 1/1982 | Bell | 210/461 |
| 4,352,737 | 10/1982 | Taniguchi | 210/168 |
| 4,387,023 | 6/1983 | Napier | 210/168 |
| 4,402,827 | 9/1983 | Joseph | 210/314 |

FOREIGN PATENT DOCUMENTS 524585 12/1953 Belgium .

Primary Examiner—Richard V. Fisher
Assistant Examiner—Wanda L. Millard
Attorney, Agent, or Firm—Niro, Scavone, Haller & Niro

[57] ABSTRACT

A filter element for use in fluid filters which include a sealed pan, or the like, for receiving the filter element in folded condition. The element includes a generally thin, flat body shaped for receipt within the pan when in folded condition. The body has a fold line generally intermediate opposed ends thereof whereby the body can be folded upon itself. The fold line is formed by a double-line indentation or score to facilitate precise folding and alignment of the opposed ends of the filter element for precise registry within the pan.

12 Claims, 8 Drawing Figures

U.S. Patent    Aug. 5, 1986    Sheet 2 of 2    4,604,200
FIG. 7
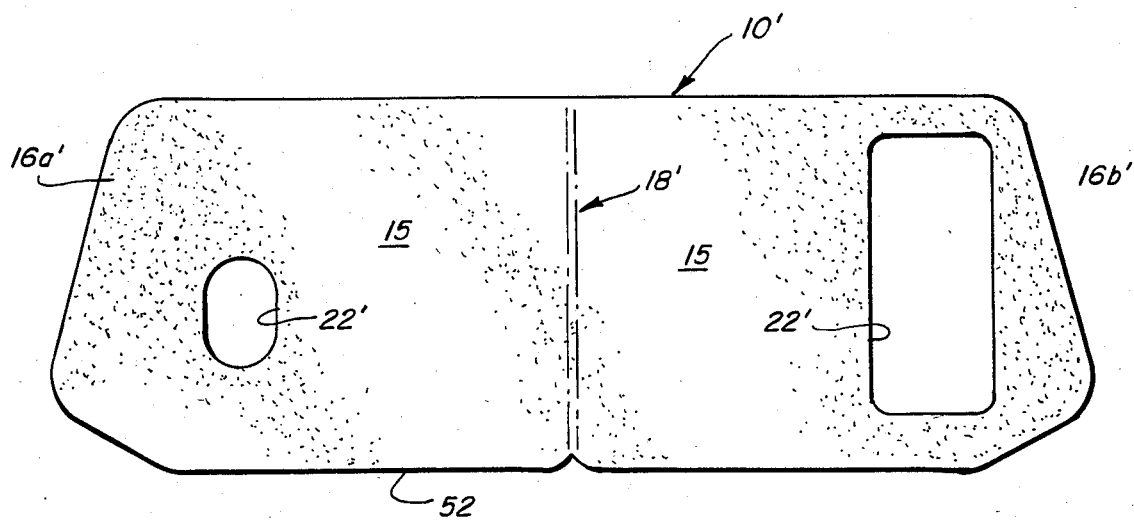
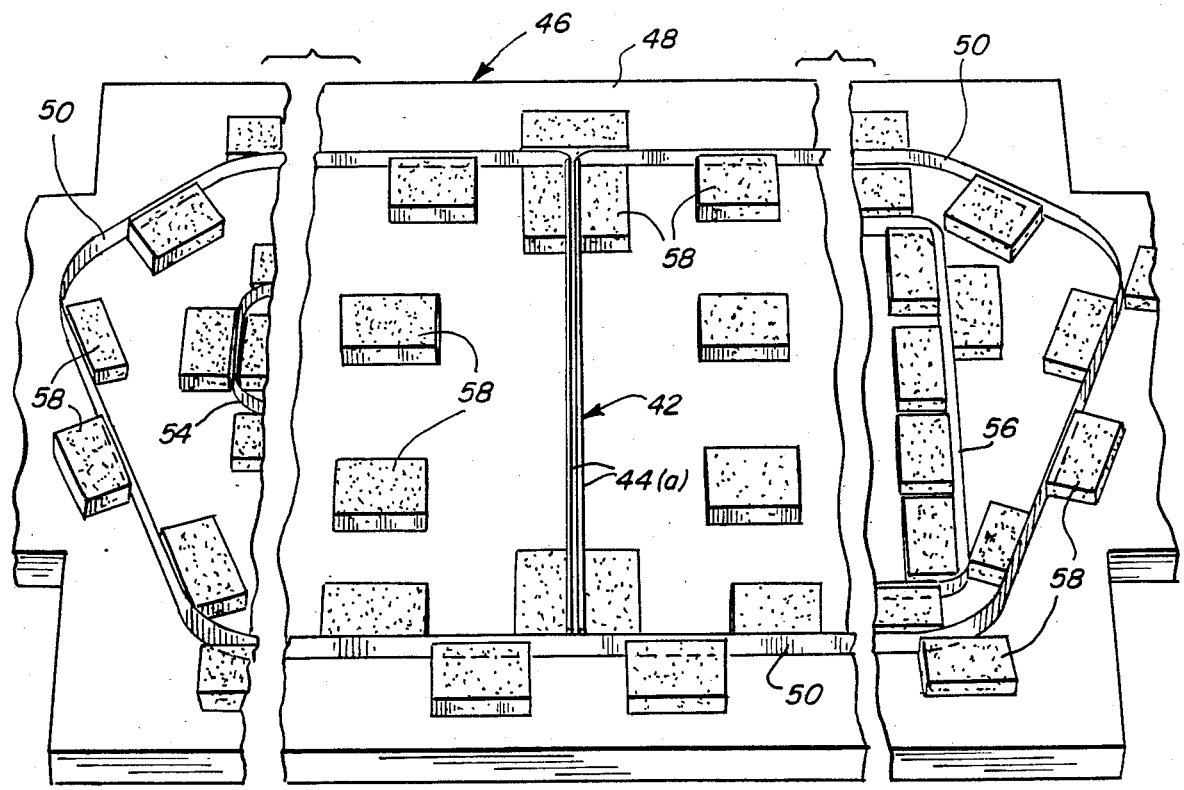
FIG. 10

FLUID FILTER WITH UNIFORM SPACING

BACKGROUND OF THE INVENTION

This invention relates generally to fluid filters and, more particularly, to a fluid filter element which is adapted to be precisely folded for use in a sealed pan, or the like.

A wide range of filter assemblies have been used in filtering various fluids, such as transmission fluids in the automotive industry. An increasingly popular filter assembly utilizes a filter element which is generally flat and folded upon itself for receipt within a relatively flat, sealed "pan" having inlet and outlet ports. The relatively flat pan reduces the overall dimensions of the filter assembly and, therefore, can fit in compact space environments. The pan normally has a desired peripheral configuration, with matching halves for containing the folded filter element. Likewise, the filter element normally has a pair of opposed ends, usually of identical configuration, whereby the opposed ends are folded back upon themselves for receipt within the complementarily shaped halves of the sealed pan. Flow-through passages also are cut in the filter element complementary to the ports of the pan.

Normally, a fold line is formed intermediate the opposed ends of the filter element to facilitate folding the element upon itself. However, heretofore, the fold lines have been formed by singular linear indentations in the filter elements which do not lend themselves to precise folding which would enable the identical or complementary opposed ends of the filter element to be folded precisely. Often, the fold line is uneven, or inconsistent at most. This causes the opposed ends of the filter element to be distorted or out of alignment, making it difficult to insert the folded filter element into registry within the matching halves of the filter pan, as well as causing improper sealing of the pan.

This invention is directed to solving the above-identified problems.

SUMMARY OF THE INVENTION

An object, therefore, of this invention is to provide an improved filter element for use in fluid filters of the character described which include a sealed pan, or the like, for receiving the filter element in folded condition.

Another object is to provide a fluid filter assembly incorporating the improved filter element.

A further object is to provide a fluid filter element which includes a double-line indentation to facilitate precise alignment of the opposed surfaces of the filter element in a face-to-face complementary manner.

In the exemplary embodiment of the invention, a filter element is formed for use in a fluid filter assembly including a sealed pan having a pair of matching halves with peripheral, interior receptacle means for receiving the filter element in folded condition. The filter element comprises a generally thin, flat body shaped for receipt within the pan when in folded condition. The body has a fold line generally intermediate the opposed ends thereof whereby the body can be folded upon itself. The fold line is formed by a double-line indentation to facilitate precise folding and alignment of the opposed ends and surfaces of the filter element for precise registry within the receptacle means of the pan. This type of precise alignment also provides improved and complete sealing of the pan.

Specifically, the double-line indentation comprises a pair of generally parallel fold lines. Preferably, the generally parallel fold lines are spaced approximately the thickness of the filter body. As contemplated herein, the body is formed of a felt-like material, such as phenolic resin impregnated polyester.

Other objects, features and advantages of the invention will be apparent from the following detailed description taken in connection with the accompanying drawings.

DESCRIPTION OF THE DRAWINGS

The features of this invention which are believed to be novel are set forth with particularity in the appended claims. The invention, together with its objects and the advantages thereof, may be best understood by reference to the following description taken in conjunction with the accompanying drawings, in which like reference numerals identify like elements in the figures and in which:

FIG. 7 is a plan view of another filter element shaped somewhat different from that of FIG. 1; and FIG. 8 is a fragmented, perspective view, on an enlarged scale, of a die assembly for fabricating the filter element of FIG. 7.

DETAILED DESCRIPTION OF THE PREFERRED EMBODIMENT

Figure 1:
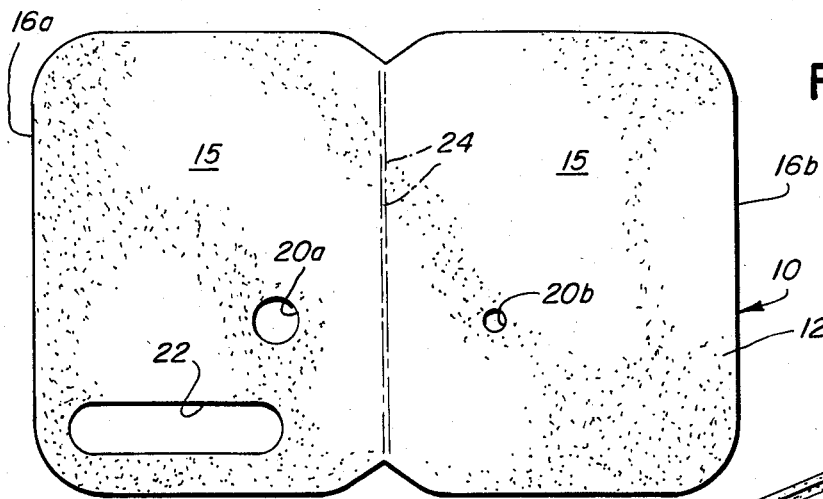
FIG. 1 is a plan view of a flat filter element fabricated according to the invention, in unfolded condition.

Referring to the drawings in greater detail, and first to FIG. 1, a filter element fabricated in accordance with the invention is generally designated 10. The filter element includes a generally thin, flat body 12 shaped for receipt within a sealed housing or pan, generally designated 14 (FIG. 3) having receptacle means described hereinafter. The flat filter element is cut into a shape having body portions 15a and 15b and opposed ends 16a and 16b, the shapes of which are defined by their outer peripheries. The opposed ends are separated by an intermediate fold line, generally designated 18. The shapes of the opposed ends may or may not be identical depending on the particular usage. Apertures 20a and 20b are cut through opposed ends 16a and 16b, respectively, for facilitating securing the filter element within the pan as described hereinafter. A second aperture 22 is formed in opposed end 16a for mating with an appropriate outlet/inlet port of the pan as also described hereinafter.

Figure 2:
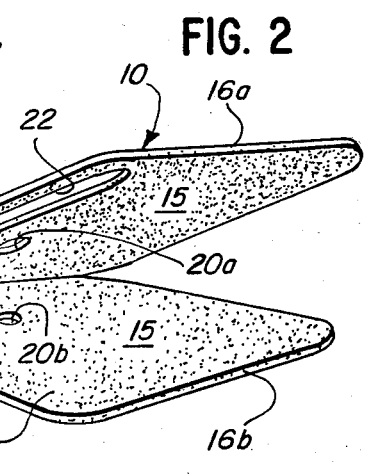
FIG. 2 is a perspective view of the filter element of FIG. 1, in partially folded condition.

FIG. 2 illustrates filter element 10 partially folded along fold line 18 in preparation for assembly within pan 14. It can be seen that body 12 has been folded back upon itself about fold line 18 with opposed body portions 15a and 15b in a face-to-face relationship. Further, opposed ends 16a, 16b are aligned in a substantially predetermined manner to facilitate precise folding and alignment of body portions 15a, 15b.

Fold line 18 is formed by a double-line indentation comprising a pair of generally parallel fold lines 24,24. Preferably, fold lines 24,24 are spaced approximately the thickness of body 12 to facilitate substantially predetermined precise folding and alignment of opposing ends 16a, 16b and generally uniform spacing of body portions 15a, 15b. Such precise folding and alignment and uniform spacing provides increased fluid flow through the filter assembly, as well as complete sealing of pan 14. The body is fabricated of felt-like material, such as phenolic resin impregnated polyester. Therefore, fold lines 24,24 are formed by parallel indentations in this material.

Figure 3:
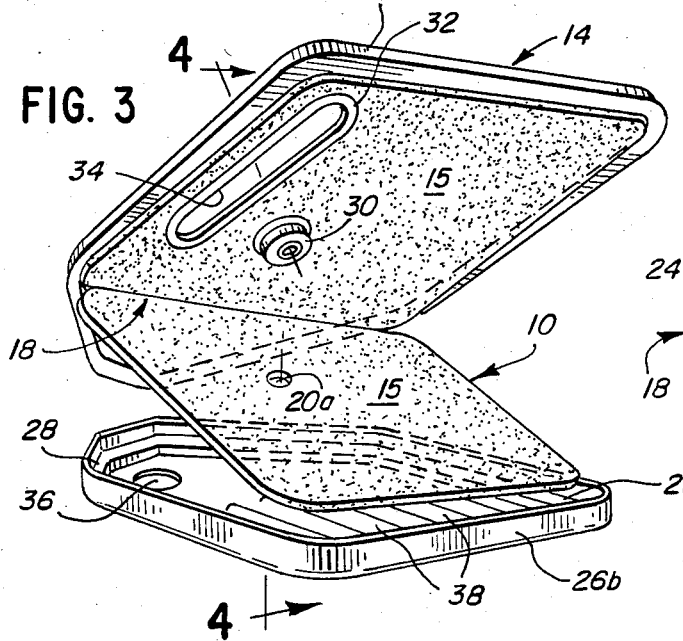
FIG. 3 is a perspective view of a filter assembly wherein the filter element of FIGS. 1 and 2 is disposed within the matching halves of a filter pan.
Figure 4:
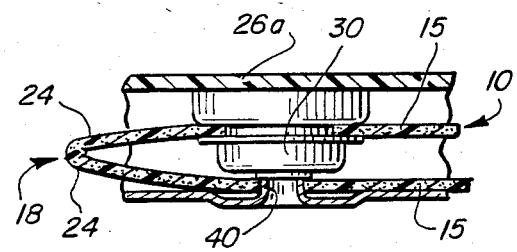
FIG. 4 is a fragmented section, on an enlarged scale, taken generally along line 4—4 of FIG. 3.

FIG. 3 shows filter element 10 in the process of being assembled in folded condition within pan 14. More particularly, pan 14 includes a pair of matching upper and lower halves 26a and 26b, respectively. Each half is recessed for forming an interior filtration compartment and includes interior peripheral shoulders 28 upon which the body portions of filter element 10 seat. Upper half 26a has a securing boss 30 which projects through aperture 20a (FIG. 1) to secure body portion 15a of the filter element within the pan. A formed flange 32 projects through and overlaps the inside of the filter element about second aperture 22 (FIG. 1) to form an outlet port 34 from the filter assembly. An inlet port 36 is formed in lower matching half 26b. Ridges 38 in lower pan half 26b facilitate spacing body portion 15b of the filter element from the bottom wall of the pan. FIG. 4 also shows a securing boss 40 which projects through aperture 20b (FIG. 1) of the filter element.

Figure 5:
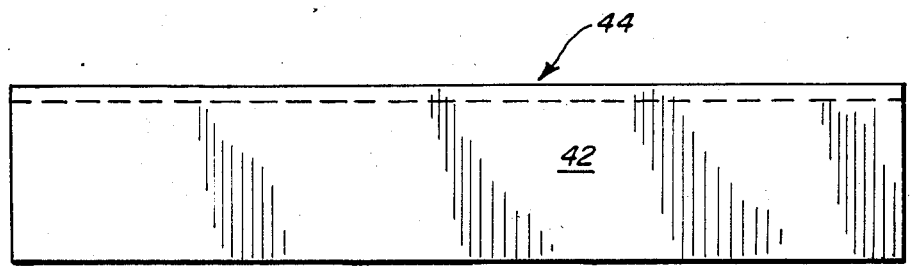
FIG. 5 is a side elevation of a striker blade for forming the double fold line of the filter element.
Figure 6:
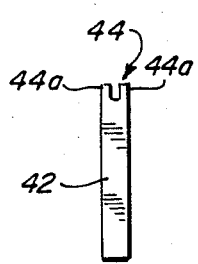
FIG. 6 is an end elevation of the striker blade of FIG. 5.

FIGS. 5 and 6 show a striker blade 42 having a striking edge, generally designated 44, for forming double fold line 18 in filter element 10. More particularly, edge 44 of blade 42 includes a pair of generally parallel edge portions 44a which are spaced to form the generally parallel, spaced indentations 24,24 by depressing or scoring the felt-like material of the filter element at spaced linear locations. This unique double-score or indented fold line eliminates the "crumbling" of the felt-like material of the filter element and also eliminates the uneven and inconsistent folding of prior filter elements. The importance of an undistorted fold line can clearly be seen with reference to the assembly of FIG. 3. If opposed ends 16a, 16b of the filter element were not in proper alignment, the ends would be offset and would not match the complementary receptacle means within the matching halves of the filter assembly pan, causing a less than desirable partial seal. This drastically interferes with rapid and efficient assembly and use of the filter unit. With the double-score fold line of this invention, body portions 15a, 15b of filter element 10 consistently fold directly upon each other allowing opposed ends 16a, 16b to be in precise alignment for precise registry within the matching halves of the filter assembly pan, creating an improved complete seal and improved fulid flow. Consistency in obtaining a precisely aligned fold greatly improves the number of complete filter assemblies which can be manufactured in a given time on a filter assembly manufacturing line, thereby realizing great cost advantages over prior filter assemblies.

FIG. 7 illustrates a filter element, generally designated 10' having opposed body portions 15a, 15b and opposed ends 16a' and 16b', with inlet/outlet ports 22', and including a fold 18' having double-score indentations 24',24'. This filter element simply is of a different shape than that of filter element 10 illustrated in FIG. 1.

The sizes and shapes of the filter elements can vary widely simply depending upon the size and shape of the fluid filter assembly within which the element is to be used.

FIG. 8 illustrates a die assembly, generally designated 46, for forming filter element 10' in the shape illustrated in FIG. 7. More particularly, a die board 48 has a peripheral cutting blade 50 which is in closed configuration for cutting the peripheral edge 52 (FIG. 7) of filter element 10' to form the shape of the element. The element is cut out of a larger sheet of the aforesaid felt-like material upon striking the mateial with die assembly 46. Interior cutting blades 54 and 56 are provided for cutting ports 22' (FIG. 7). Resilient release blocks 58 are provided along the cutting blades and at selected other points on die board 48. These blocks compress when the filter sheet is struck by the die assembly and expand to strip and remove the filter material from the blades when the die assembly is lifted off of the filter material. It can be seen that striker blade 42 extends transversely across the die assembly generally centrally thereof to form double-scored indentations 24',24' through the cutting action of parallel cutting edge portions 44(a) (FIG. 7), as described above. Thus, the double-scored indentations 24', 24' can be formed simultaneously with the cutting of the filter element in its desired shape.

The invention contemplates the method of fabricating a filter element, such as elements 10 or 10', by providing a generally thin, flat sheet of filter material, such as the felt-like material described above. A filter element of a desired size and shape is cut from the sheet for receipt within a filter pan when in folded condition. Double score lines 24,24; 24',24' are formed substantially simultaneously with cutting the filter element to size and shape.

It will be understood that the invention may be embodied in other specific forms without departing from the spirit or central characteristics thereof. The present examples and embodiments, therefore, are to be considered in all respects as illustrative and not restrictive, and the invention is not to be limited to the details given herein.

What is claimed is:

1. A filter element for use in fluid filters which include a housing, for receiving the filter element in a folded condition, comprising a generally thin, flat body shaped for receipt within the housing defining two body portions when in said folded condition, said body having a fold line generally intermediate opposed ends thereof whereby the body is folded upon itself about said fold line in a substantially predetermined manner, and said fold line being formed by a double-line indentation comprising a pair of generally parallel fold lines to facilitate precise, substantially predetermined, folding and alignment of said opposed ends and generally uniform spacing of said body portions within said housing, providing improved fluid flow through the fluid filter.

2. The filter element of claim 1 wherein said generally parallel fold lines are spaced approximately the thickness of said body.

3. The filter element of claim 2 wherein said body comprises a felt-like material.

4. The filter element of claim 3 wherein said material comprises phenolic resin impregnated polyester.

5. A method of fabricating a filter element for use in fluid filters which include two sealable pan members, for receiving the filter element in a precisely folded condition, comprising the steps of:

providing a generally thin, flat sheet of filter material having opposed ends defining a filter body;

cutting said filter element from said sheet in a shape for receipt between said pan members when in said precisely folded condition; and forming a double fold line formed by a pair of generally parallel line indentations generally intermediate said opposed ends of the filter element allowing the filter body to be precisely folded upon itself about said double fold line and said opposed ends precisely aligned in a predetermined manner.

6. The method of claim 5 wherein said sheet is provided of felt-like material.

7. The method of claim 6 wherein said material comprises phenolic resin impregnated polyester.

8. The method of claim 5 wherein said double fold line is formed simultaneously with cutting the filter element from the sheet.

9. The method of claim 5 wherein said generally parallel fold lines are spaced approximately the thickness of said body.

10. A fluid filter assembly, comprising:

a pan including a pair of matching halves with peripheral, interior receptacle means for receiving a folded filter element; and a filter element including a generally thin, flat body shaped for receipt within said pan when in a precisely folded condition, said body having a fold line generally intermediate opposed ends thereof defining two body portions whereby the body portions can be precisely folded about said fold line in a face-to-face relation, and said fold line being formed by a double-line indentation comprising a pair of generally parallel fold lines spaced approximately the thickness of said body to facilitate substantially predetermined precise folding and alignment of said opposed ends and generally uniform spacing of said body portions providing increased fluid flow through said fluid filter assembly, as well as complete sealing of said pan.

11. The fluid filter assembly of claim 10 wherein said body comprises a felt-like material.

12. The fluid filter assembly of claim 11 wherein said material comprises phenolic resin impregnated polyester.

* * * * *